June 17, 1930.                L. E. THOMAS                 1,764,425
                        APPARATUS FOR SKINNING ANIMALS
                             Filed June 10, 1929
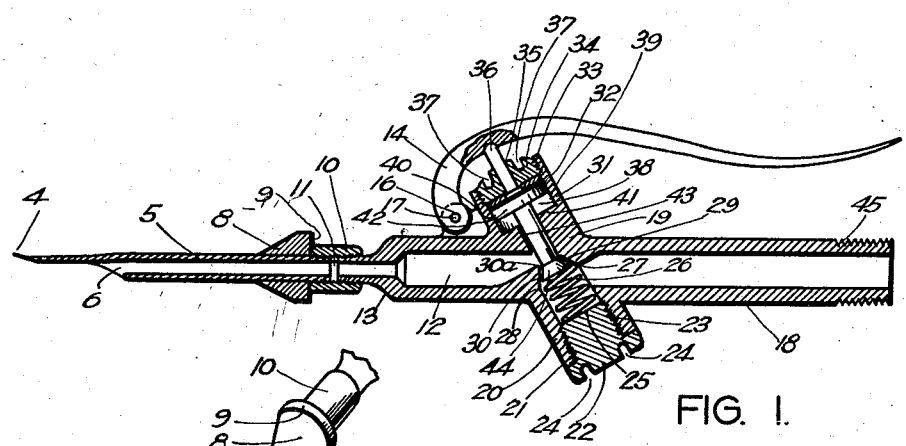
FIG. 1.
FIG. 2.
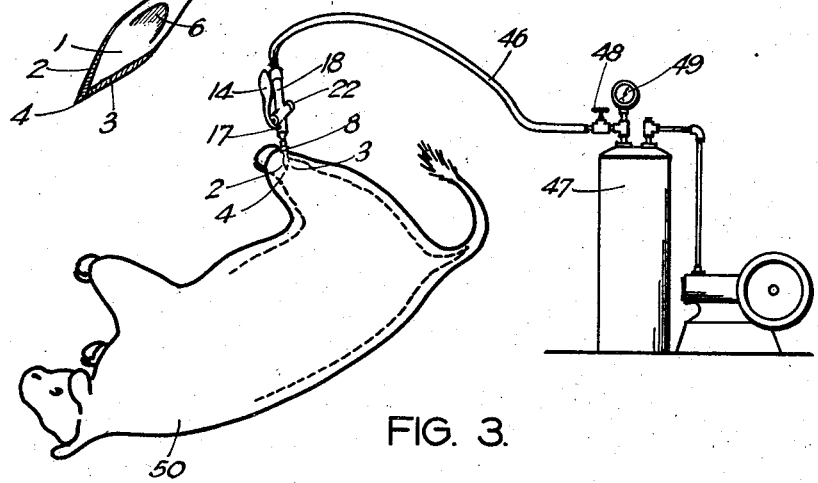
FIG. 3.
Logan E. Thomas
                INVENTOR.
BY Loyal J. Miller
                ATTORNEYS.

Patented June 17, 1930

1,764,425

UNITED STATES PATENT OFFICE

LOGAN E. THOMAS, OF CHOCTAW, OKLAHOMA

APPARATUS FOR SKINNING ANIMALS

Application filed June 10, 1929. Serial No. 369,888.

My invention relates to improvement in the process in the use of air in skinning animals and an apparatus for the application of air. The object of my invention is to produce a process and device for its application which will be more efficient and effective in removing the hides or skins of animals; that will remove such hides without tearing or cutting them; that will remove such hides without cutting or marring the flesh of the animal underneath such hides; that will be new, novel, and of utility; that will be cheap, that will be easily applied; that will be speedier.

With these and other objects in view, the invention consists in the process, construction and novel combination of parts hereinafter described, illustrated in the accompanying drawing, and pointed out in the claims hereto appended; it being understood that various changes in the form, proportion, size, and minor details of construction, within the scope of the claims may be resorted to without departing from the spirit or sacrificing any of the advantages of the invention.

I attain these objects as is shown in one embodiment thereof by the mechanism and device illustrated in the accompanying drawing, in which—

Figure 1 is an elevational sectional view of the device; Fig. 2 is a perspective view of knife and incision instrument; Fig. 3 is a perspective view of the device as applied to the animal connected to an air compressor.

Like characters of reference designate like parts in all the figures.

The ordinary and usual manner of skinning animals is by the use of a knife stripping the hide little by little from the carcass of the animal. This results at best in the spending of much time in the performing of this, and results also in the flesh being cut in various places, and in the hide, or skin, being cut and injured so far as the making of leather therefrom is concerned. So far as the knowledge of the inventor is concerned, no method of using air as is herein contained for assisting in the removal of hides of animals has ever been used or known. The process of applying compressed air, or air, between the hide and the body, and the use of my device causes the hide to be inflated and separated from the carcass, or body, and permits it to be easily drawn off, or causes it, in the case of heavy hides, to fall off of its own weight when properly positioned or suspended.

One embodiment of my invention and the manner of applying the same, is as follows:

I provide a flat blade 1 having two sharp edges 2, 3, with a sharp point 4. This is built up on a round neck portion 5 having an opening 6 therethrough extending its entire length; near its hilt 7, I provide a bevel-shaped portion 8 of a soft pliable material, such as rubber, with a shoulder 9; into this rubber hilt or abutting the same, I provide a ferrule of metal 10 surrounding said portion 5 fastened to said neck portion by a holding member 11. Back of said ferrule I provide a barrel 12 having a front shoulder 13. Said barrel forms a seat for a lever thereabove pivoted to a lug 15 integral with said barrel by a shoulder and pivot-pin 17. Said barrel 12 and lever 14 also form a handle 18 for the using of said device. Toward the front portion of said barrel 12 and near the front portion of the lever 14, I provide a valve chest 19. The preferred form thereof is diagonally across said barrel; but this may be varied as to form when desired. Said barrel chest has on its lower portion a round cylindrical portion 20 with an inner bore extending therefrom into said barrel, and said member extends below said handle 18, its inner lower portion being threaded 21 to receive a similarly threaded plug seat 22, said threads being shown at 23 having two grooves 24 with which more easily to screw and unscrew the same; its inner surface 25 forming a seat for a valve spring 26. The inner part of said barrel has two inwardly extending portions beginning at 27, 28, having beveled surfaces 29, 30, forming a valve seat 30ª with an aperture between its topmost surfaces. On the upper side of said barrel 12 is an inwardly extending cylindrical portion 31 in line with said cylindrical portion 20 below said barrel. This is preferably made integral with said barrel. A bore 32 from its top is threaded 33 to approximately one-fourth the length of the bore, said threaded portion 33 seating a similarly threaded plug head 34. Said plug head has a central perforation 35 therethrough adapted to hold and act as a bearing for a plunger rod, or button 36. In its top said plug head 34 has two grooves 37 with which more easily to be tightened and loosened.

Below said plug head is a valve chamber 38 formed by said bore 32 its side valve faces 39, 40, being equal in depth, the surface at their bottoms forming a valve head-seat 41. A head 42 is seated in valve chamber 38. Said valve head is integral with valve stem 43, and said valve stem has on its lower end a valve head 44. The outer surface of the lower handle 18 is threaded 45 and adapted to be attached to an air hose 46 leading to a compressed air tank 47 having a cut-off 48, and preferably a gauge 49.

In operation after the animal has been killed and its carcass 50 is either lying down or is hung up, the hand of the operator grasps the handle 18 between the air line and the valve chest 19. With the other hand the loose skin of the animal is lifted and the point 4 of the blade is thrust through the skin of the animal, between the skin and the flesh, preferably at some place where the skin is comparatively loose, and the blade and neck 5 is inserted at least sufficiently to cover opening 6, and preferably to the point where beveled portion 8 will be under the skin and shoulder 9 presses against the outside surface of the skin. It is better if the operator lifts up on the instrument slightly after making the first part of the incision. As soon as the instrument is inserted as above described the operator presses downwardly on lever 14; this causes plunger rod 36 to press on valve head 42 and descend in the valve chamber 38 lowering valve stem 43 with valve 44 on its lower end. Said valve 44 is released from its valve seat 30ª tightening valve spring 26 and opening the cavity in the barrel 12 permitting the air from compressed air tank 47 to escape and flow through hole or aperture 6 and be introduced between the skin and flesh of the animal. The hide being tough permits the air to be introduced between the skin and flesh in such quantity as to make the animal have an inflated appearance and to permanently loosen the hide from the flesh; the lever 14 is then released. The pressure being taken therefrom spring valve 26 pushes 44 valve stem 43 and valve head 42 into their normal positions, shutting off the passage of the compressed air from the air tank; the instrument can then be with-drawn and the skin of the animal slit under the neck and around the hoofs, head and horns, cutting same with an ordinary skinning knife and the pelt can be easily removed from the carcass; or if the animal is hanging, the hide will of its own weight, when so cut, fall of the body.

It is my desire to protect the process of applying the use of air under the hide of animals for skinning them, as well as to secure a patent on the particular device as above described. I desire also to cover the application under a saline liquid or other liquid, when desired, between the hide of the animal and the body and also when the same is used in connection with compressed air.

From the description and the accompanying one page drawing, and the specification, the advantages of construction, application and manufacture will be apparent to those skilled in the art to which my invention pertains. I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims without departing from the principles of the invention.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the form of the device other than as herein described as fairly fall within the scope of my invention.

Having thus described my invention what is claimed and desired to be secured by Letters Patent, is:

1. A device of the character described, comprising a valve, a long longitudinal body member having an air chamber therein and housing said valve, and having a handle member thereon adapted to open and close said valve, a second body member crossing said first body member and integral therewith, and seating and housing said valve, a hollow necked metallic member having a two-edged pointed cutting blade at its front end being adapted to cut an incision in the skin, and having a ferrule at its other end being adapted to fit the front end of said first body member; a beveled rubber shoulder intermediate said ferrule and said cutting blade, said cutting blade and said hollow neck being adapted to penetrate under the skin in said incision and said shoulder being adapted to close said incision, the outer end of said first body member being adapted to connect a source of supply of compressed air, and the like.

2. An apparatus, as described, for removing hides from animal carcasses, embodying a cutting member for cutting incisions through the hide, having an integral hollow stem portion for introducing air between the hide and flesh, a beveled surfaced soft cylindrical collar surrounding said stem adjacent its hilt for sealing the air within the hide around said incision, a barrel for connecting said stem at one end and adapted to connect a receptacle for compressed air at the other end, a valve partially housed in said barrel for controlling the flow of air from said receptacle to said stem, a handle lever pivotally attached to said barrel for controlling said valve.

3. An apparatus, as described, for removing hides from animal carcasses, embodying a cutting member for cutting incisions through the hide, having an integral hollow stem portion for introducing air between the hide and flesh, a beveled surfaced soft cylindrical collar surrounding said stem adjacent its hilt for sealing the air within the hide around said incision, a barrel for connecting said stem at one end and adapted to connect a receptacle for compressed air at the other end, said barrel having a valve partially housed therein for controlling the flow of air from said receptacle to said stem, a handle lever pivotally attached to said barrel for controlling said valve.

4. An apparatus, as described, for removing hides from animal carcasses, embodying a cutting member for cutting incisions through the hide, having an integral hollow stem portion for introducing air between the hide and flesh, a beveled surfaced soft cylindrical collar surrounding said stem adjacent its hilt for sealing the air within the hide around said incision, a barrel for connecting said stem at one end and adapted to connect a receptacle for compressed air at the other end, said barrel having a valve partially housed therein for controlling the flow of air from said receptacle to said stem, said valve controlled by a handle lever pivotally mounted on said barrel.

LOGAN E. THOMAS.